US012748497B2

(12) United States Patent
Ishibashi

(10) Patent No.: US 12,748,497 B2
(45) Date of Patent: Sep. 29, 2026

(54) INFORMATION PROCESSING APPARATUS, NON-TRANSITORY COMPUTER READABLE MEDIUM, AND METHOD FOR PROCESSING INFORMATION FOR USING A NON-CONTACT GESTURE USER INTERFACE

(71) Applicant: FUJIFILM BUSINESS INNOVATION CORP., Tokyo (JP)

(72) Inventor: Tomohiro Ishibashi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/179,464

(22) Filed: Mar. 7, 2023

(65) Prior Publication Data

US 2024/0031498 A1 Jan. 25, 2024

(30) Foreign Application Priority Data

Jul. 22, 2022 (JP) ................................ 2022-117468

(51) Int. Cl.
*H04N 1/00* (2006.01)
*G06F 3/01* (2006.01)

(52) U.S. Cl.
CPC ......... *G06F 3/017* (2013.01); *H04N 1/00381* (2013.01); *H04N 2201/0094* (2013.01)

(58) Field of Classification Search
CPC ... G06F 3/017; G06F 3/0488; H04N 1/00381; H04N 2201/0094
See application file for complete search history.

(56) References Cited

U.S. PATENT DOCUMENTS

| | | | | |
|---|---|---|---|---|
| 10,146,423 | B1 * | 12/2018 | Reed | G07F 9/0235 |
| 2005/0253807 | A1 * | 11/2005 | Hohmann | G06F 3/043 345/156 |
| 2007/0106939 | A1 * | 5/2007 | Qassoudi | G06F 3/0486 715/704 |
| 2012/0036479 | A1 | 2/2012 | Kasahara et al. | |
| 2013/0019182 | A1 | 1/2013 | Gil et al. | |
| 2014/0110695 | A1 | 4/2014 | Benwadih | |
| 2015/0261305 | A1 * | 9/2015 | Lee | G06F 3/04842 345/157 |
| 2015/0277573 | A1 * | 10/2015 | Kang | G06F 3/017 345/156 |
| 2023/0076343 | A1 * | 3/2023 | Sui | A63F 13/44 |

FOREIGN PATENT DOCUMENTS

| | | | |
|---|---|---|---|
| JP | 2010-175636 | A | 8/2010 |
| JP | 2012-037978 | A | 2/2012 |
| JP | 2012248066 | A | 12/2012 |
| JP | 2014-520400 | A | 8/2014 |
| JP | 2014-521172 | A | 8/2014 |

OTHER PUBLICATIONS

Mar. 3, 2026 Office Action issued in Japanese Patent Application No. 2022-117468.
Aug. 18, 2026 Office Action issued in Japanese Patent Application No. 2022-117468.

* cited by examiner

*Primary Examiner* — Rinna Yi
(74) *Attorney, Agent, or Firm* — Oliff PLC

(57) ABSTRACT

An information processing apparatus includes a processor configured to: detect a specific noncontact operation performed by a user on an operation surface; and display, if the specific noncontact operation is detected, an operation object for achieving a gesture operation based on movement of the user with respect to the operation surface.

11 Claims, 14 Drawing Sheets

INFORMATION PROCESSING APPARATUS, NON-TRANSITORY COMPUTER READABLE MEDIUM, AND METHOD FOR PROCESSING INFORMATION FOR USING A NON-CONTACT GESTURE USER INTERFACE

CROSS-REFERENCE TO RELATED APPLICATIONS

This application is based on and claims priority under 35 USC 119 from Japanese Patent Application No. 2022-117468 filed Jul. 22, 2022.

BACKGROUND

(i) Technical Field

The present disclosure relates to an information processing apparatus, a non-transitory computer readable medium, and a method for processing information.

(ii) Related Art

An information processing apparatus with which a non-contact operation, which is an operation performed on an operation surface without an operation medium, such as a finger or a stylus, coming into direct contact with the operation surface, can be performed has been proposed.

Japanese Unexamined Patent Application Publication (Translation of PCT Application) No. 2014-521172, for example, discloses a device that displays a context-based menu as a result of a gesture operation associated with a launcher indicator in order to allow a user to execute a command from the context-based menu.

Japanese Unexamined Patent Application Publication No. 2012-37978 discloses an information processing apparatus that detects a position of an operation medium with respect to an operation screen, that displays, on the basis of a result of the detection, a function object and an execution object for executing a function corresponding to the function object, and that sequentially displays, in the operation screen, objects associated with an object selected using the operation medium.

SUMMARY

With an apparatus equipped with a noncontact-type user interface (UI), there are gesture operations hard to perform without touching a screen. Even among operations that can be easily performed with a contact-type UI, such as a tap, a double tap, a long tap, a pinch-in, and a pinch-out, for example, there are operations hard to perform with a non-contact-type UI.

Aspects of non-limiting embodiments of the present disclosure relate to providing an information processing apparatus and a method for processing information that enable a user to execute an operation equivalent to a gesture operation by performing an operation on an operation object, and a non-transitory computer readable medium storing a program used therefor.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: detect a specific noncontact operation performed by a user on an operation surface; and display, if the specific noncontact operation is detected, an operation object for achieving a gesture operation based on movement of the user with respect to the operation surface.

BRIEF DESCRIPTION OF THE DRAWINGS

An exemplary embodiment of the present disclosure will be described in detail based on the following figures, wherein.

DETAILED DESCRIPTION

Figure 1:
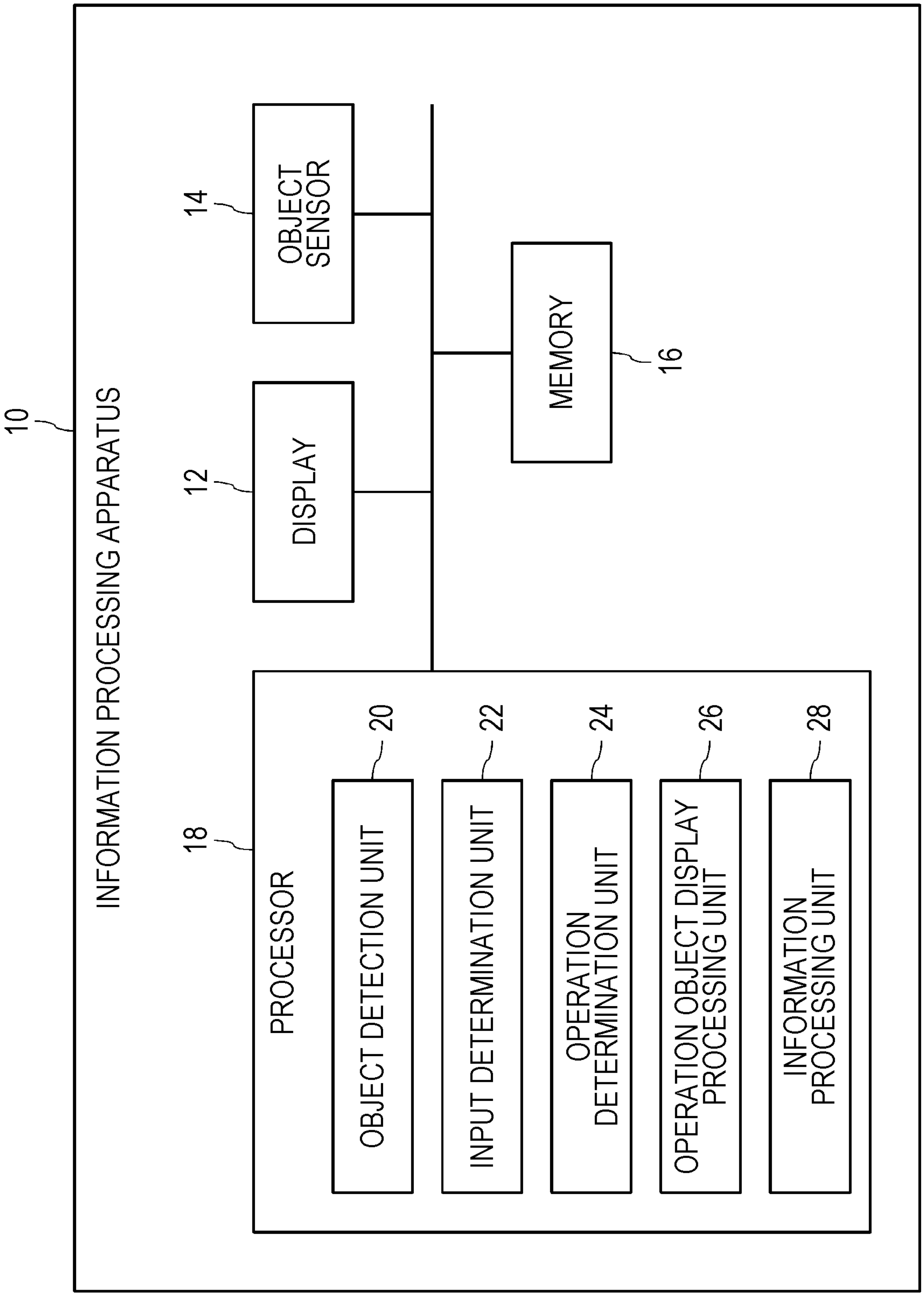
FIG. 1 is a schematic diagram illustrating the configuration of an information processing apparatus according to an exemplary embodiment.

FIG. 1 is a schematic diagram illustrating the configuration of an information processing apparatus 10 according to an exemplary embodiment. As described in detail later, the information processing apparatus 10 includes a UI with which a noncontact operation can be performed. A noncontact operation refers to an operation performed on an operation surface using an operation medium without the operation medium coming into direct contact with the operation surface. A noncontact operation is also called a "hover operation". A contact operation refers to an operation performed on an operation surface using an operation medium with the operation medium coming into direct contact with the operation surface. An operation medium is a medium for performing an operation, and may be, for example, a user's finger or a stylus.

In the present exemplary embodiment, the information processing apparatus 10 is a multifunction device that has a printing function, a copying function, a scanning function, and the like and that performs printing, copying, scanning, or the like in accordance with a processing command (job) from the user, but the information processing apparatus 10 is not limited to this, and may be any device with which noncontact operations can be performed.

As illustrated in FIG. 1, the information processing apparatus 10 includes a display 12, an object sensor 14, a memory 16, and a processor 18. Although not illustrated, the information processing apparatus 10 may also include a communication interface (e.g., a network interface card (NIC)) for communicating with other devices over a communication network such as a local area network (LAN) or a wide area network (WAN) and a processing device that performs printing or scanning (e.g., a printer or a scanner).

The display 12 is a display unit for displaying operation screens. The display 12 includes, for example, a liquid crystal panel or an organic electroluminescent (EL) panel. The processor 18 displays various screens on the display 12. For example, the display 12 displays an operation screen including objects to be subjected to a noncontact operation or a contact operation. The objects include operation icons and various buttons to be used by the user.

The object sensor 14 is a detection unit that detects approach or contact of an object. The object sensor 14 detects an object in contact with or close proximity to a display surface of the display 12. More specifically, the object sensor 14 detects presence or absence of an object in close proximity to or contact with the display 12 and a position of the object. A position of an object includes a position of the object on a plane parallel to the display 12 and a position of the object in a direction perpendicular to the display 12. The object sensor 14 detects not only an operation medium for performing noncontact operations and contact operations on the display 12 but also any object approaching the display 12.

In the present embodiment, the display surface of the display 12 corresponds to the operation surface to be subjected to operations. In the following description, the operation surface will be simply referred to as the "display 12". In the following description, a screen displayed on the operation surface of the display 12 will be referred to as an "operation screen", and the operation surface and the operation screen will be distinguished from each other.

One of various known methods for detecting an object may be employed. For example, the object sensor 14 may be a capacitive sensor that detects changes in capacitance between the display 12 and an object. In this case, the processor 18 can detect presence or absence of an object detected by the object sensor 14 and a position of the object in accordance with changes in capacitance between the display 12 and the object. Alternatively, the object sensor 14 may be an optical sensor that detects light. In this case, a light source, which is not illustrated, emits infrared light or laser light onto the display surface of the display 12, and the object sensor 14 detects reflected light, especially light reflected from the object. The processor 18 can detect presence or absence of an object and a position of the object on the basis of the reflected light detected by the object sensor 14. By providing the object sensor 14 over the display 12, an object in close proximity to or contact with the display 12 can be detected.

The object sensor 14 transmits a detection signal indicating detection of an object and a position of the detected object to the processor 18.

The memory 16 includes a hard disk drive (HDD), a solid-state drive (SSD), an embedded MultiMediaCard (eMMC), a read-only memory (ROM), a random-access memory (RAM), or the like. The memory 16 stores a program for processing information, which is used to operate the components of the information processing apparatus 10. The program for processing information may be stored in a non-transitory computer readable medium, instead, such as a universal serial bus (USB) memory or a compact disc read-only memory (CD-ROM). The information processing apparatus 10 can read the program for processing information from the medium and execute the program.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. As illustrated in FIG. 1, the processor 18 achieves functions of an object detection unit 20, an input determination unit 22, an operation determination unit 24, an operation object display processing unit 26, and an information processing unit 28 in accordance with the program for processing information stored in the memory 16.

Figure 2:
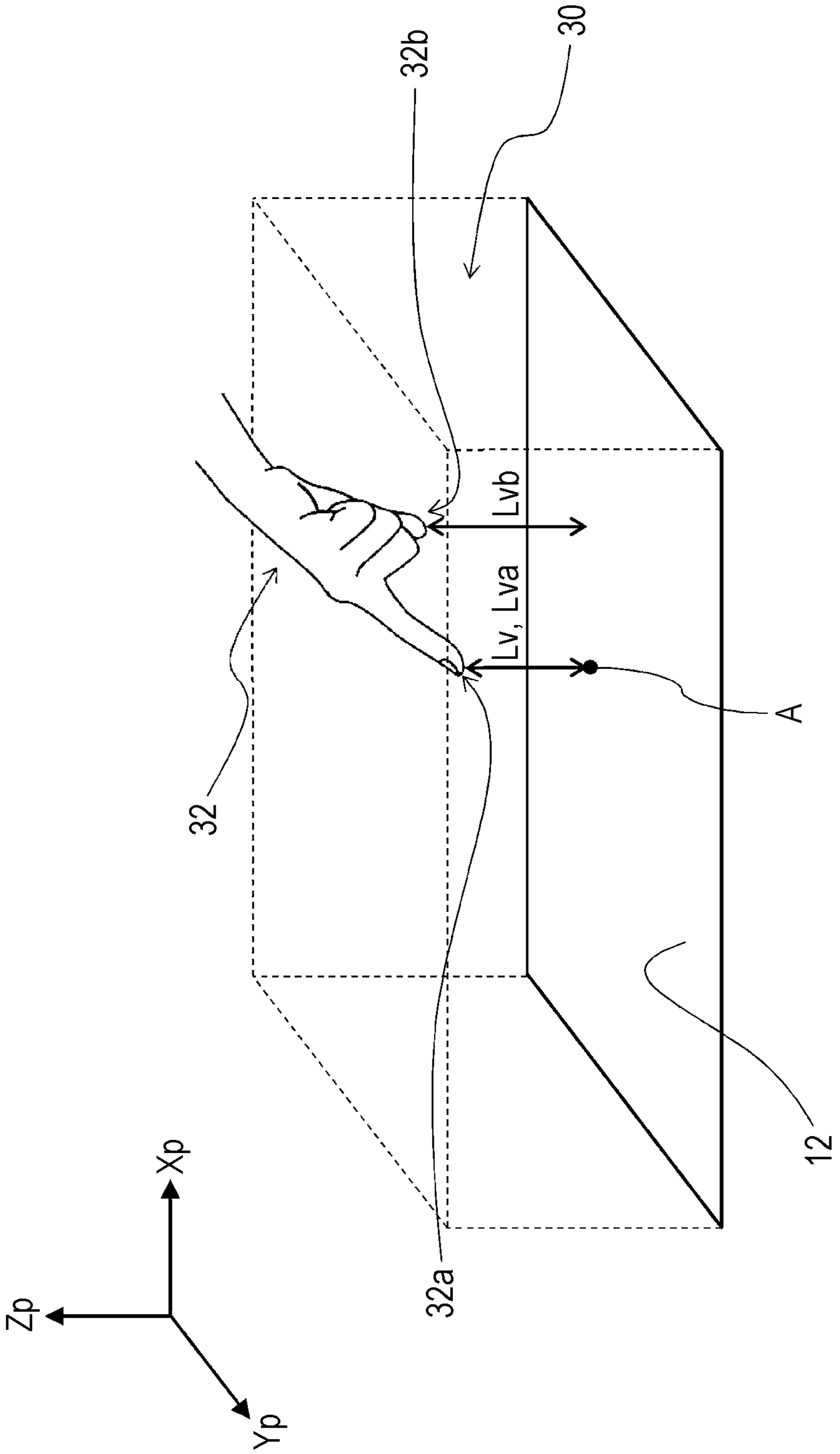
FIG. 2 is a diagram illustrating a space in front of an operation surface and an operation performed on the operation surface.
Figure 3:
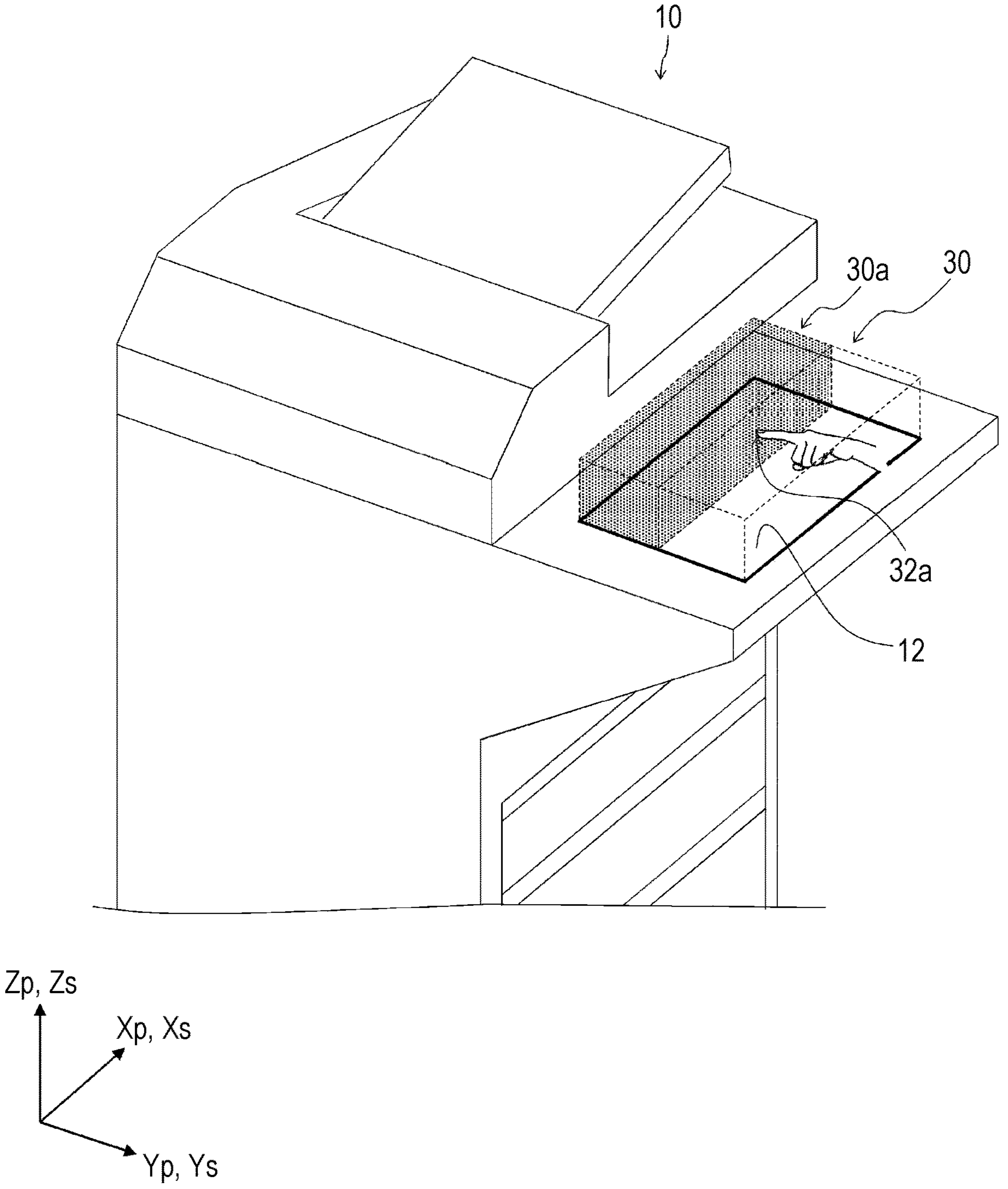
FIG. 3 is another diagram illustrating the space in front of the operation surface and the operation performed on the operation surface.

The object detection unit 20 detects an object inside a space in front of the display 12 on the basis of a detection signal from the object sensor 14. A process performed by the object detection unit 20 will be specifically described with reference to FIGS. 2 and 3. FIGS. 2 and 3 illustrate a space 30 in front of the display 12 and an operation medium 32 at least partially located inside the space 30. A direction parallel to the display 12 (a lateral direction of the display 12) is defined as an Xp-axis, a direction parallel to the display 12 and perpendicular to the Xp-axis (a longitudinal direction of the display 12) is defined as a Yp-axis, and a direction perpendicular to the display 12 is defined as a Zp-axis.

The space 30 in front of the display 12 is an area through which the display 12 passes when the display 12 is translated in a positive direction of the Zp-axis and an area within a certain distance from the display 12 in a Zp-axis direction. The certain distance, that is, the length of the space 30 in the Zp-axis direction is determined in accordance with a detectable range of the object sensor 14. That is, the certain distance may be a distance within which the object sensor 14 can detect an object.

As illustrated in FIG. 2, when an object approaches the display 12, the object sensor 14 detects the operation medium 32. More specifically, the object sensor 14 detects parts of the operation medium 32 for operating the information processing apparatus 10, that is, for example, tips of an index finger and a thumb of the operation medium 32.

Since an object inside the space 30 can move, the object detection unit 20 detects positions of parts of an object inside the space 30 at unit time intervals. Here, the unit time intervals are time intervals of, for example, several milliseconds or shorter. The object detection unit 20 transmits a detection signal indicating the positions of the parts of the object to the processor 18.

The input determination unit 22 determines a position A on the display 12 corresponding to a position of a closest one of parts of an object detected by the object detection unit 20 as a command input position based on the user's contact or noncontact operation. The input determination unit 22 compares distances Lv of parts inside the space 30 from the display 12 on the basis of a detection signal from the object sensor 14. The input determination unit 22 then determines, among the parts inside the space 30, a part whose distance Lv is the smallest as a closest part. In the case of a contact operation, the distance Lv of a closest part is zero.

In the example illustrated in FIG. 2, parts 32*a* and 32*b*, which are tips of an index finger and a thumb, respectively, of the operation medium 32, are illustrated as representative examples of parts of an object inside the space 30 detected by the object sensor 14. The object detection unit 20 compares a distance Lva between the part 32*a* and the display 12 in the Zp-axis direction, a distance Lvb between the part 32*b* and the display 12 in the Zp-axis direction, and a distance Lv between each of parts of other objects inside the space 30 and the display 12 in the Zp-axis direction and, because the distance Lva is the smallest, determines that the part 32*a* corresponding to the distance Lva as a closest part.

A position A on the display 12 corresponding to a position of a closest part is a point on the display 12 whose Xp coordinate and Yp coordinate are the same as those of a closet part. That is, when a position of a closest part is expressed by coordinates (Xp, Yp, Zp)=(x, y, z) in an XpYpZp space, a command input position is expressed by coordinates (Xp, Yp)=(x, y) on the display 12.

Since an object inside the space 30 can move as described above, the input determination unit 22 determines a closest part and a corresponding position A on the display 12 at the unit time intervals on the basis of detection signals from the object sensor 14.

Figure 4:
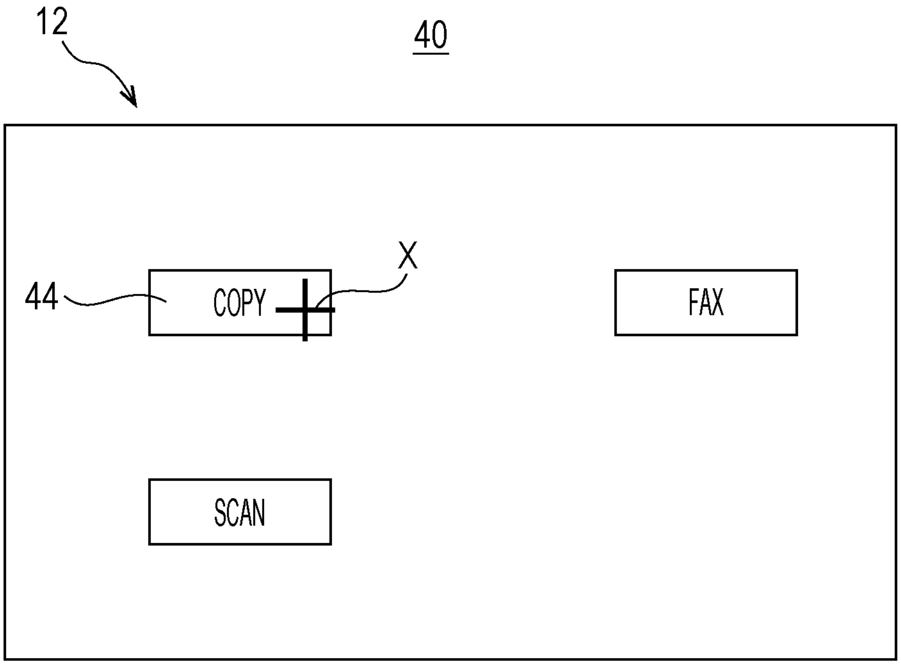
FIG. 4 is a diagram illustrating an example of a menu image.

As illustrated in FIG. 4, an operation screen 40 of the display 12 displays a cursor X at a position on the display 12 corresponding to a closest part. That is, the cursor X indicates that a position to be operated on the operation screen 40 is a position on the display 12 corresponding to a closest part. FIG. 4 illustrates a state where the cursor X is located over an operation icon 44 for "copy".

The operation determination unit 24 determines details of an operation performed on the information processing apparatus 10 in accordance with a closest part and a corresponding position A on the display 12 determined by the input determination unit 22. Details of an operation refer to any details of the operation such as whether the operation has been performed in a noncontact or contact manner and which operation icon displayed on the operation surface of the display 12 the operation has been performed on.

When an operation icon associated with some type of processing is displayed at a command input position on the display 12 at which a contact operation has been performed, for example, the operation determination unit 24 can determine, by determining the command input position, that a contact operation has been performed on the operation icon. When a gesture operation is possible, the operation determination unit 24 can determine, in accordance with temporal changes in the command input position, that a gesture operation has been performed.

A gesture operation is an operation that can be performed on the basis of the user's movement with an operation medium 32 in contact or noncontact with the operation surface. A gesture operation refers to an operation based on movement of the operation medium 32, that is, movement of a command input position (movement pattern). By associating movement patterns of a command input position and types of processing with each other in advance, the operation determination unit 24 can detect a movement pattern of a command input position and determine a command in accordance with the detected movement pattern. The processor 18 performs a type of processing associated with an identified gesture.

Gesture operations include, for example, a flick, a swipe, a tap, a double tap, a triple tap, a long tap, a pinch-in, a pinch-out, and a pressure-sensitive tap. A flick is an operation where the operation medium 32 is moved quickly and then released from the operation surface. A flick may be used to perform processing using information regarding a flick direction. A flick is used, for example, to switch an operation screen or for a flick-input software keyboard. A swipe is an operation where the operation medium 32 is moved in a plane with the distance of the operation medium 32 to the operation surface maintained within a certain range. A swipe may be used to perform processing in accordance with a direction in which the operation medium 32 is moved. A swipe is used, for example, to scroll through an operation screen or move an object. A tap is an operation where the operation medium 32 is moved to the operation surface at a speed higher than or equal to a certain value. A tap may be used to identify a position on the operation surface in a plane and perform processing. A tap is used, for example, to perform processing for achieving a general function associated with an object displayed on the operation surface. A double tap and a triple tap are operations where two or three taps are performed within a certain period of time. A double tap and a triple tap, too, may be used to identify a position on the operation surface in plane and perform processing. A double tap and a triple tap are used, for example, to perform processing for achieving a function other than a general function associated with an object displayed on the operation surface. A long tap is an operation where the operation medium 32 is moved to the operation surface at a speed higher than or equal to a certain value and then maintained within a certain range for a certain period of time. A long tap, too, may be used to identify a position on the operation surface in plane and perform processing. A long tap is used, for example, to perform processing for selecting an object or processing for displaying a submenu associated with an object. A pinch-in is an operation where two operation media 32, such as two fingers, come into contact with the operation surface and are then brought closer to each other. A pinch-in may be used to perform processing in accordance with changes in a distance between the two operation media 32. A pinch-in is used, for example, to perform processing for reducing an image displayed on the operation surface. A pinch-out is an operation where two operation media 32, such as two fingers, come into contact with the operation surface and are then moved away from each other. A pinch-out may be used to perform processing in accordance with changes in a distance between the two operation media 32. A pinch-out is used, for example, to perform processing for enlarging an image displayed on the operation surface. A pressure-sensitive tap is an operation performed in accordance with a level of pressure with which the operation medium 32 is pressed against the operation surface. A pressure-sensitive tap may be used to identify a position in a plane and perform different types of processing depending on the level of pressure. A pressure-sensitive tap is used, for example, to perform processing for displaying a submenu associated with an object displayed on the operation surface. In order to perform an operation based on a pressure-sensitive tap, the object sensor 14 needs to include a pressure sensor.

Gesture operations, however, are not limited to these, and may be any gestures performed on the operation surface in order to achieve some types of processing.

When an operation icon associated with some type of processing is displayed at a command input position on the display 12 at which a noncontact operation has been performed, the operation determination unit 24 can determine, by determining the command input position, that a noncontact operation has been performed on the operation icon. When the distance Lv between the display 12 and the operation medium 32 decreases at a certain speed or higher with a command input position of the operation medium 32 maintained within an area of an operation icon displayed on the display 12, for example, the operation determination unit 24 can determine that a noncontact operation has been performed on the operation icon. The user can thus move the operation medium 32 inside the space 30 without bringing the operation medium 32 into contact with the display 12, in order to move a command input position and input a command based on a gesture.

By associating movement patterns of a command input position and types of processing with each other in advance for other gesture operations, the operation determination unit 24 can detect a movement pattern of a command input position and determine a command in accordance with the detected movement pattern. The processor 18 performs a type of processing associated with an identified gesture.

The operation determination unit 24 also determines a specific noncontact operation performed on the operation surface. The specific noncontact operation is a noncontact operation performed on the operation surface and an operation for displaying an operation object for performing a type of processing corresponding to a gesture operation.

The specific noncontact operation may be, for example, an operation where the object sensor 14 detected an object that was not in contact with the display 12 but a state that is not valid as a gesture operation for an object displayed on the operation surface has been established for a certain reference period of time or longer. The specific noncontact operation is, for example, a state where the operation medium 32 has remained in a display area of one of objects displayed on the operation surface for the certain reference period of time or longer. In this case, for example, the user might know an object indicating a desired function but not know how to perform a noncontact operation and might be thinking without moving the operation medium 32.

Here, the reference period of time may be appropriately set. The reference period of time may be fixed at a certain value or different between operation surfaces. For example, the reference period of time may be a statistical mean or median of periods of time for which the user maintains a state that is not valid as a gesture operation for an object when the user is confused about a noncontact operation. The set reference period of time may be the same for all the operation surfaces or a statistical mean or median, for each operation surface, of periods of time for which the user maintains a state that is not valid as a gesture operation.

In addition, the reference period of time may differ depending on the number, types, functions, and use conditions of objects displayed on the operation surface. For example, the reference period of time may become longer as the number of displayed objects increases. Alternatively, for example, the reference period of time may become longer as the types of objects displayed in the operation screen 40 increase. Alternatively, for example, the set reference period of time may be changed in accordance with the functions of objects displayed in the operation screen 40. Alternatively, for example, the reference period of time may become longer as use frequencies of objects displayed in the operation screen 40 decrease.

The specific noncontact operation may be an operation where the operation medium 32 in a display area of one of objects displayed on the operation surface is moved in a pattern that satisfies a certain condition. For example, the specific noncontact operation may be an operation where the operation medium 32 is moved in a small circle in a display area of one of objects displayed on the operation surface. The pattern that satisfies the certain condition is not limited to a small circle, and may be another pattern or a plurality of patterns. For example, the specific noncontact operation may be an operation where the operation medium 32 is brought close to the object sensor 14 and shaken in a display area of one of objects, instead.

The operation object display processing unit 26 performs processing for displaying an operation object for performing an operation corresponding to a noncontact gesture operation. An operation object is an object for requesting the same type of processing as one requested by a gesture operation that can be performed on the operation surface of the display 12. That is, when the user selects an operation object with the operation medium 32, the same type of processing as one at a time when a gesture operation associated with the selected operation object has been performed is performed. A gesture operation associated with an operation object is, for example, the same type of processing as one performed when a flick, a swipe, a tap, a double tap, a triple tap, a long tap, a pinch-in, a pinch-out, a pressure-sensitive tap, or the like has been performed. A gesture operation associated with an operation object, however, is not limited to one of these gestures, and may be another gesture operation or a gesture operation uniquely set by the user, instead.

Figure 5:
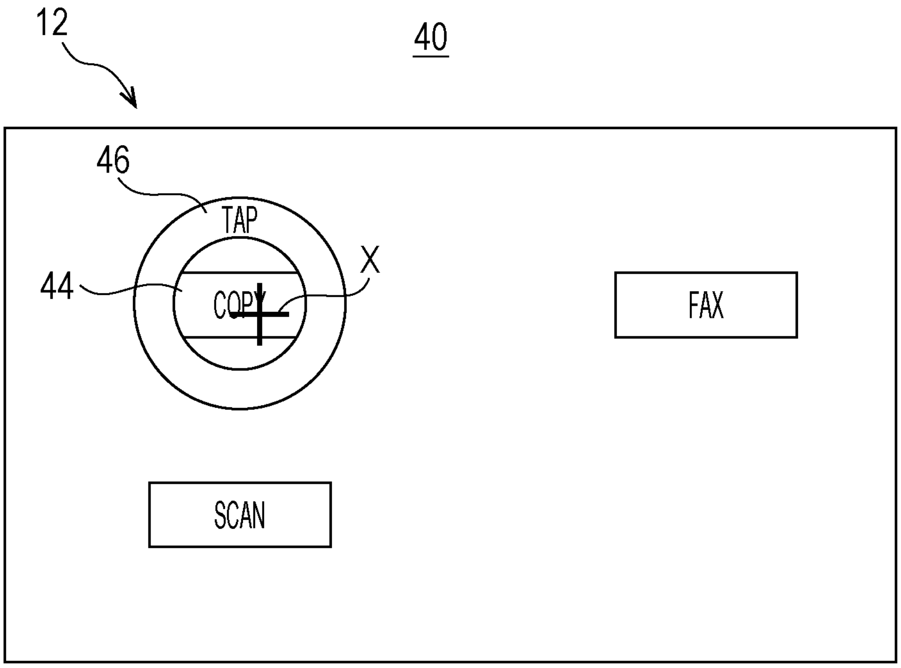
FIG. 5 is a diagram illustrating an example of an operation screen in which an operation object is displayed.

A display mode of an operation object is not particularly limited. As illustrated in FIG. 5, for example, information indicating a gesture operation is displayed as an operation object 46. In an example illustrated in FIG. 5, information indicating a gesture operation "tap" is displayed as an operation object 46.

The information processing unit 28 performs information processing in the information processing apparatus 10. If the operation determination unit 24 determines that an operation has been performed on an object, such as an operation icon or a button, displayed on the display 12, the information processing unit 28 performs a type of information processing associated with the object. Processing performed by the information processing unit 28 is not particularly limited, and may include any types of processing provided by the information processing apparatus 10. When the information processing apparatus 10 is a multifunction device, the information processing unit 28 may perform copying, facsimile, scanning, printing, and the like. When the operation icon 44 indicating copying is selected in FIG. 4, for example, the information processing unit 28 performs copying.

If the operation determination unit 24 determines that a contact or noncontact gesture operation has been performed, the information processing unit 28 performs a type of information processing associated with the gesture operation. A type of information processing associated with a gesture operation may be, for example, one associated with a flick, a swipe, a tap, a double tap, a triple tap, a long tap, a pinch-in, a pinch-out, or the like.

If the operation determination unit 24 determines that an operation object has been selected, the information processing unit 28 performs the same processing as one at a time when a gesture operation associated with the operation object has been performed.

Operations Based on Operation Objects

Figure 6:
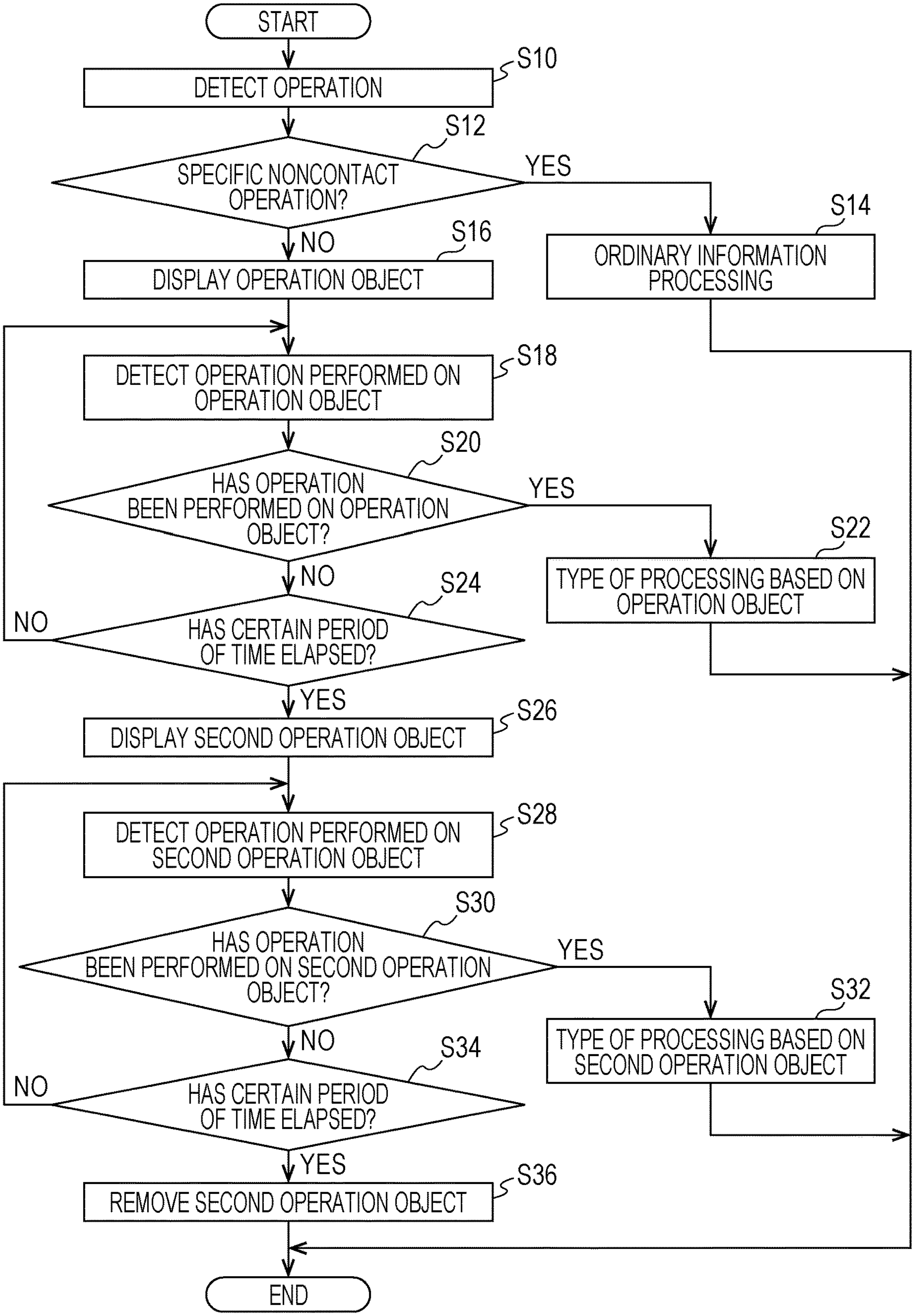
FIG. 6 is a flowchart illustrating information processing according to the exemplary embodiment.

FIG. 6 is a flowchart illustrating information processing performed by the information processing apparatus 10. The processor 18 achieves processing in each of steps by executing the program for processing information stored in the memory 16. The information processing including operations based on operation objects will be described hereinafter with reference to FIG. 6.

In step S10, an operation performed on the operation surface is detected. The object detection unit 20 and the input determination unit 22 perform processing in this step. An object inside the space in front of the operation surface is detected on the basis of a detection signal from the object sensor 14. In addition, positions of parts of an object detected by the object detection unit 20 and a position of a closest part are determined as command input positions.

In step S12, whether a specific noncontact operation has been performed is determined. The operation determination unit 24 performs the processing in this step. If a specific noncontact operation has been performed, the information processing proceeds to step S16, and if another contact or noncontact operation has been performed, the information processing proceeds to step S14. If the object sensor 14 detected an object that was not in contact with the operation surface but a state that is not valid as a gesture operation for an object displayed on the operation surface has been established for the certain reference period of time or longer, for example, the operation determination unit 24 determines that a specific noncontact operation has been performed, and the information processing proceeds to step S16.

In step S14, ordinary information processing based on the contact or noncontact operation performed in step S12 is performed. The information processing unit 28 performs the processing in this step. If a contact operation has been performed on an operation icon, for example, a type of information processing associated with the operation icon has been performed. If a contact or noncontact gesture operation is performed, for example, a type of processing associated with the gesture operation is performed.

In step S16, processing for displaying an operation object is performed in accordance with the specific noncontact operation. The operation object display processing unit 26 performs the processing in this step.

As illustrated in FIG. 5, for example, processing for displaying the operation object 46 is performed. In this example, a case is illustrated where the specific noncontact operation has been performed with a position of a closest part of an object, such as the operation medium 32, indicated by the cursor X over the operation icon 44. In this case, the operation object 46 for performing an operation corresponding to a noncontact gesture operation that can be performed on the operation icon 44 is displayed. In the example illustrated in FIG. 5, the operation object 46 for performing a tap, which is one of gesture operations, is displayed in such a way as to surround the operation icon 44 for "copy", which is an operation target icon, displayed at a position at which the specific noncontact operation has been performed.

Figure 7:
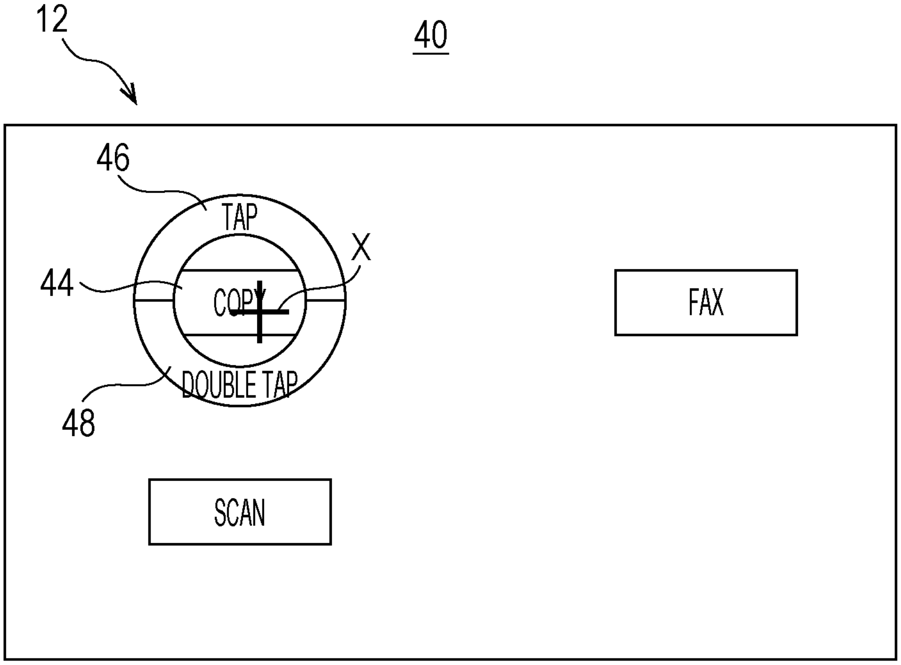
FIG. 7 is a diagram illustrating another example of the operation screen in which operation objects are displayed.
Figure 8:
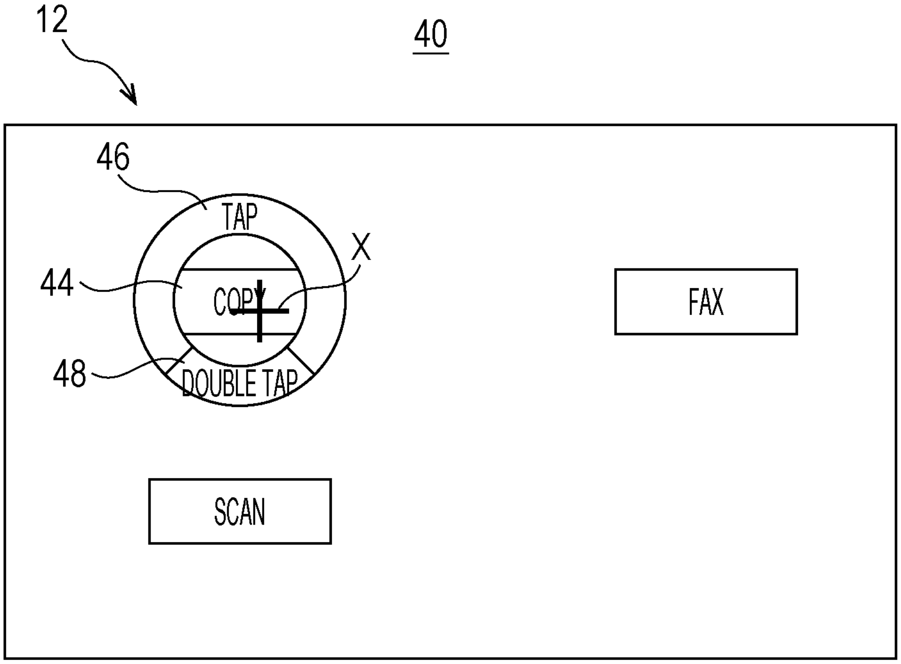
FIG. 8 is a diagram illustrating another example of the operation screen in which operation objects are displayed.

An operation object is not limited to one corresponding to one gesture operation, and operation objects for two or more gesture operations may be displayed, instead. As illustrated in FIG. 7, for example, an operation object 48 for performing a double tap may be displayed in addition to the operation object 46 for performing a tap.

When an operation object is displayed, the area of a display area of the operation object need not always be the same. The area of a display area of an operation object may differ depending on an importance level, such as a use frequency or a use probability, of an operation achieved using the operation object. More specifically, a display area of an operation object may become larger as a use frequency of an operation achieved using the operation object becomes higher. At this time, a ratio of areas of display areas of operation objects may be set in accordance with a ratio of use frequencies of operations. Alternatively, a display area of an operation object may become larger as a use probability of an operation achieved using the operation object becomes higher. At this time, a ratio of areas of display areas of operation objects may be set in accordance with a ratio of use probabilities of operations.

If a use frequency of a tap is higher than that of a double tap, for example, a display area of the operation object 46 for performing a tap may be larger than that of the operation object 48 for performing a double tap.

Figure 9:
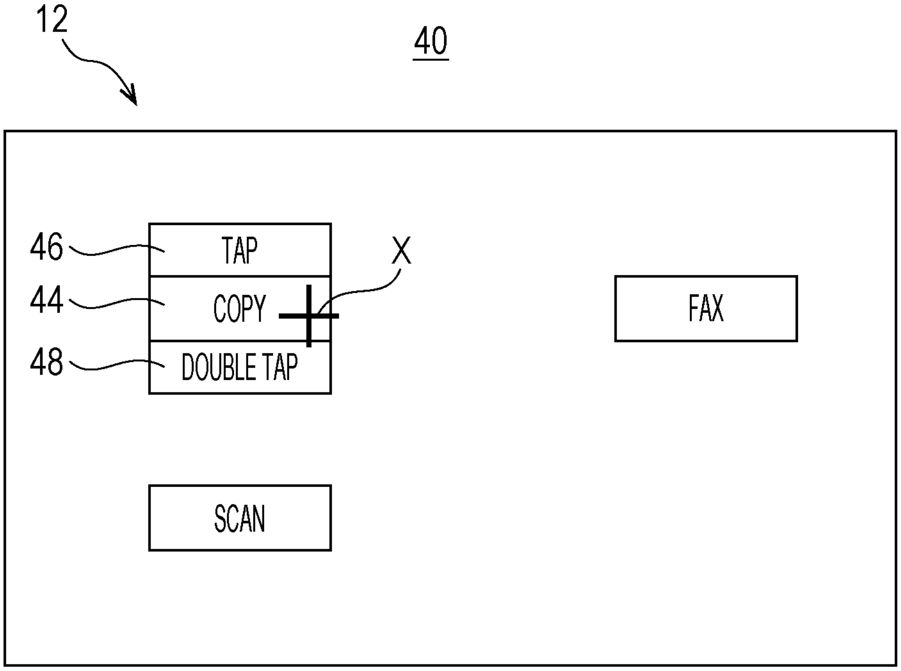
FIG. 9 is a diagram illustrating another example of the operation screen in which operation objects are displayed.
Figure 10:
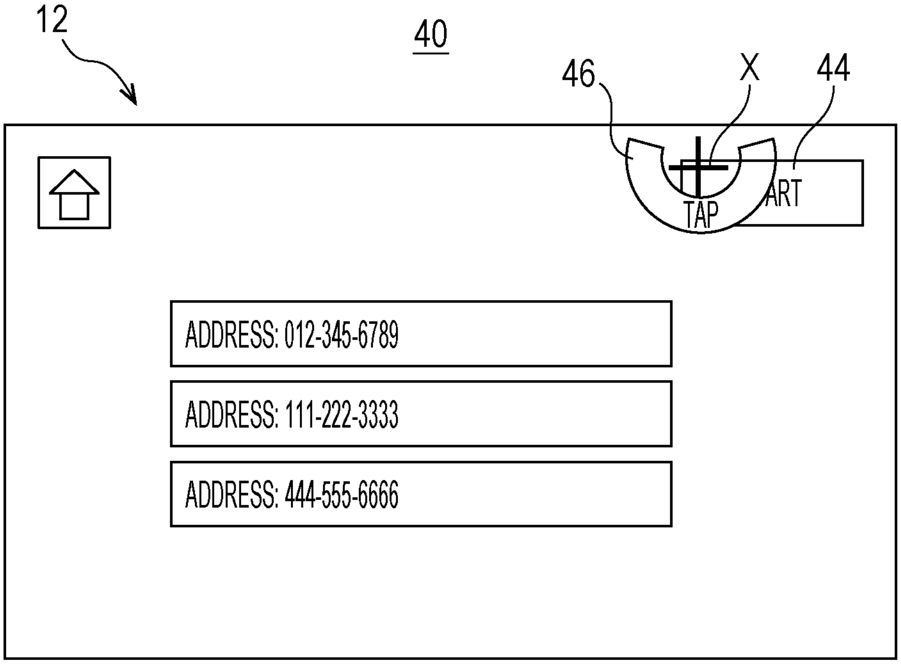
FIG. 10 is a diagram illustrating another example of a display mode of the operation object.
Figure 11:
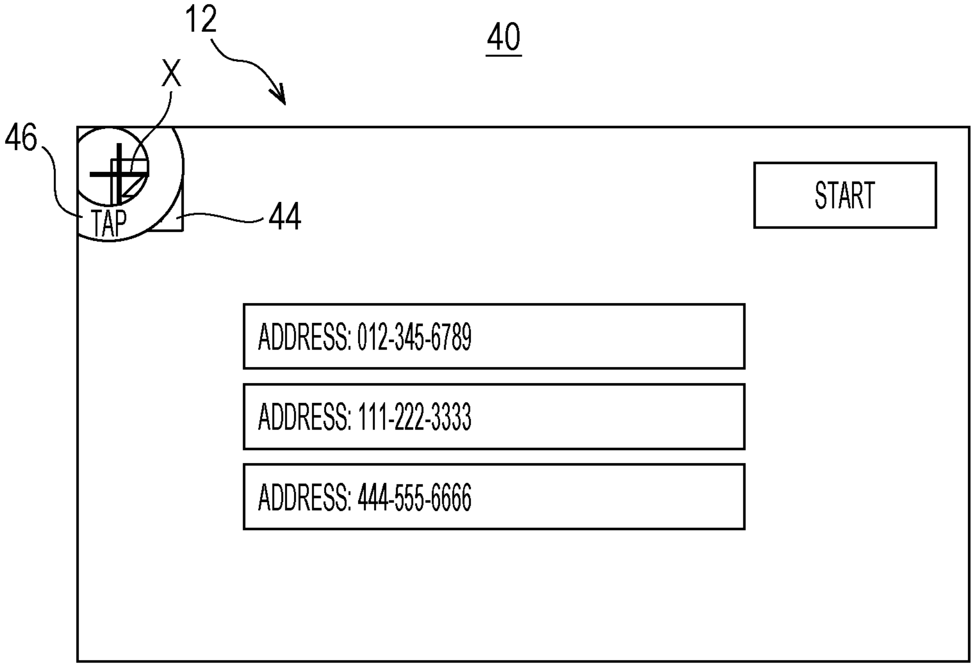
FIG. 11 is a diagram illustrating another example of the display mode of the operation object.

A shape of an operation object is not limited to a circle or a ring, and may be another shape, instead. As illustrated in FIG. 9, for example, a rectangular operation object 46 for performing a tap and a rectangular operation object 48 for performing a double tap may be displayed on a top and a bottom, respectively, of the operation icon 44 for "copy", which is the operation target icon, instead. When the cursor X is near an edge of a display screen of the display 12 as illustrated in FIGS. 10 and 11, for example, an operation object 46 having a partially notched ring shape may be displayed.

Figure 12:
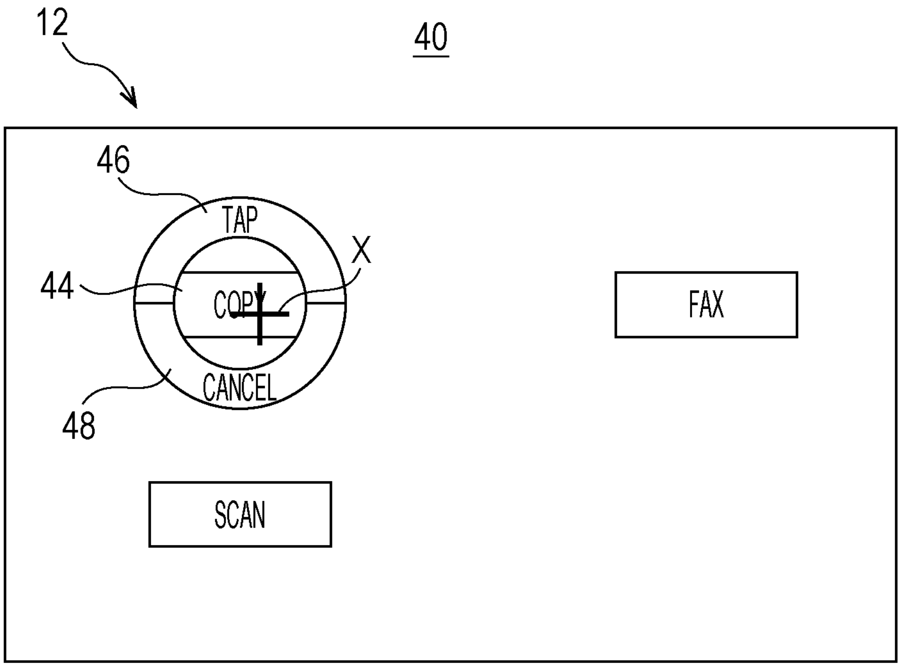
FIG. 12 is a diagram illustrating an operation screen in which operation objects including one for cancellation are displayed.

An operation for performing cancellation may also be displayed. As illustrated in FIG. 12, for example, an operation object 48 for performing cancellation may be displayed in addition to the operation object 46 for performing a tap.

In step S18, an operation performed on the operation object is detected. The object detection unit 20 and the input determination unit 22 perform the processing in this step. An object inside the space in front of the operation surface is detected and a position of a closest part of the detected object is obtained on the basis of a detection signal from the object sensor 14.

In step S20, whether an operation has been performed on the operation object is displayed. The operation determination unit 24 performs the processing in this step. If an operation has been performed on the operation object displayed in step S16, the information processing proceeds to step S22, and if an operation has not been performed on the operation object, the information processing proceeds to step S24.

Figure 13:
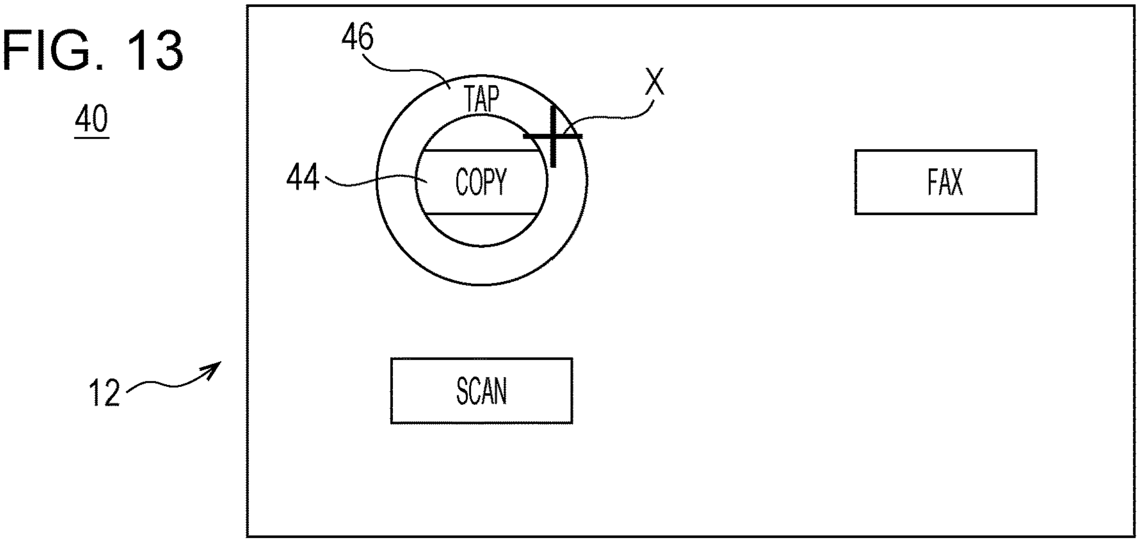
FIG. 13 is a diagram illustrating an example of an operation screen at a time when an operation has been performed on an operation object for a tap.

If a position of a closest part of the object detected in step S18 has moved from the display area of the operation icon 44 for "copy" to that of the operation object 46 for "tap" as indicated by the cursor X illustrated in FIG. 13, for example, the operation determination unit 24 determines that an operation has been performed on the operation object 46 for "tap". In this case, the information processing proceeds to step S22. If the position of the closest part of the detected object remains over the operation icon 44 for "copy" even after the operation object 46 for "tap" is displayed as illustrated in FIG. 5, on the other hand, the operation determination unit 24 determines that an operation has not been performed on the operation object 46 for "tap". In this case, the information processing proceeds to step S24.

In step S22, a type of processing based on the operation object is performed. The information processing unit 28 performs the processing in this step. A type of processing based on an operation associated with the operation object used in steps S18 and S20 is performed.

If an operation has been performed on the operation object 46 for "tap" as illustrated in FIG. 13, processing is performed on an assumption that a tap has been performed on the operation target icon for "copy". For example, the information processing apparatus 10 copies a document. In addition, although not illustrated, if an operation has been performed on an operation object for "cancellation", an already displayed operation object is removed, and the operation screen 40 before the operation object is displayed may be restored.

In step S24, whether a specific noncontact operation has been performed is determined. The operation determination unit 24 performs the processing in this step. For example, whether a period of time for which an operation has not been performed on the operation object in step S20 after the operation object was displayed in step S16 is longer than or equal to a reference period of time is determined. If the period of time for which an operation has not been performed on the operation object is shorter than the reference period of time, the information processing returns to step S18 and is repeated from the detection of an operation performed on the operation object. If the period of time for which an operation has not been performed on the operation object is longer than or equal to the reference period of time, the information processing proceeds to step S26.

In step S26, processing for displaying a second operation object is performed. The operation object display processing unit 26 performs the processing in this step. The second operation object is not particularly limited, but may be an operation object for performing a gesture operation whose importance level, such as a use frequency or a use probability, is lower than that of the operation object displayed in step S16.

Figure 14:
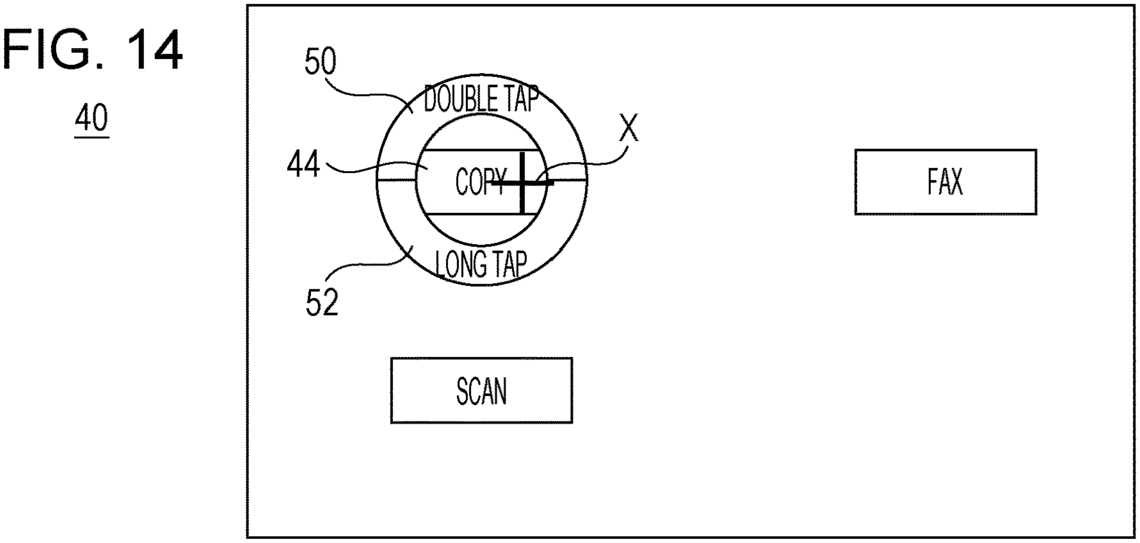
FIG. 14 is a diagram illustrating an example of an operation screen in which second operation objects are displayed.

As illustrated in FIG. 14, for example, processing for displaying second operation objects 50 and 52 is performed. The second operation objects 50 and 52 are operation objects for performing operations corresponding to noncontact gesture operations that can be performed on the operation icon 44. In the example illustrated in FIG. 14, the second operation object 50 for performing a double tap, which is a gesture operation, and the second operation object 52 for performing a long tap, which is another gesture operation, are displayed in such a way as to surround the operation icon 44 for "copy", which is the operation target icon.

Figure 15:
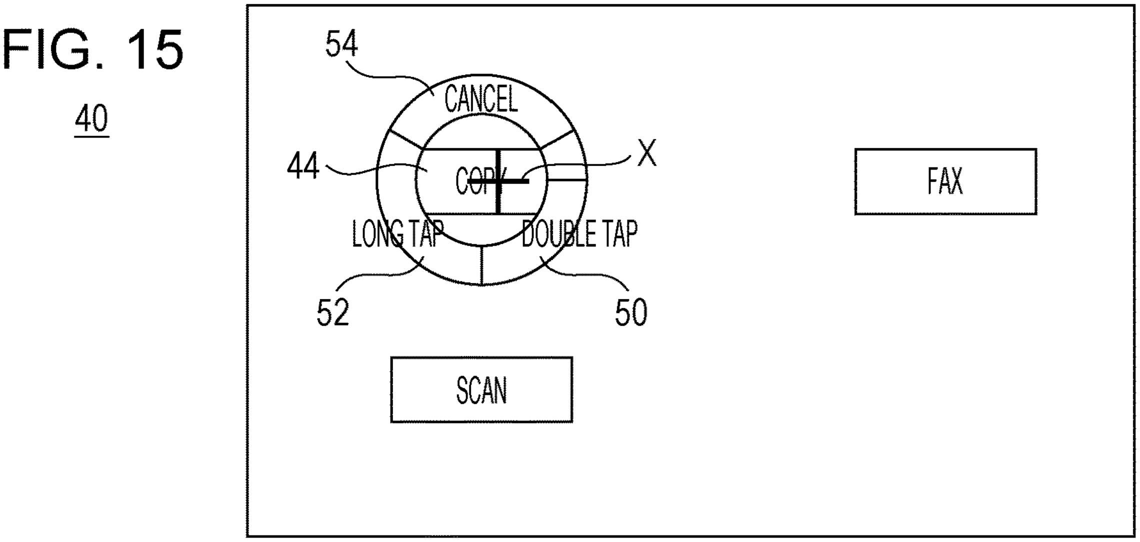
FIG. 15 is a diagram illustrating an example of an operation screen in which second operation objects including one for cancellation are displayed.

An operation object for performing cancellation may also be displayed. As illustrated in FIG. 15, for example, a second operation object 54 for performing cancellation may be displayed in addition to the second operation object 50 for performing a double tap and the second operation object 52 for performing a long tap.

In step S28, an operation performed on the operation object is detected. The object detection unit 20 and the input determination unit 22 perform the processing in this step. An object inside the space in front of the operation surface is detected and a position of a closest part of the detected object is obtained on the basis of a detection signal from the object sensor 14.

In step S30, whether an operation has been performed on the second operation object is determined. The operation determination unit 24 performs the processing in this step. If an operation has been performed on the second operation object displayed in step S26, the information processing proceeds to step S32, and if an operation has not been performed on the second operation object, the information processing proceeds to step S34.

Although not illustrated, if the position of the closest part has moved from the display area of the operation icon 44 for "copy" to that of the second operation object 50 for "double tap", for example, it is determined that an operation has been performed on the second operation object 50 for "double tap". In this case, the information processing proceeds to step S32. If the position of the closest part remains over the operation icon 44 for "copy" even after the second operation objects 50 and 52 are displayed, on the other hand, it is determined that an operation has not been performed on the second operation objects 50 and 52. In this case, the information processing proceeds to step S34.

In step S32, a type of processing based on the second operation object is performed. The information processing unit 28 performs the processing in this step. A type of processing based on an operation associated with the second operation object used in steps S28 and S30 is performed.

If an operation has been performed on the second operation object 50 for "double tap", for example, processing is performed on an assumption that a double tap has been performed on the operation target icon for "copy". For example, processing for displaying a submenu for selecting processing relating to the operation target icon for "copy" may be performed.

Figure 16A:
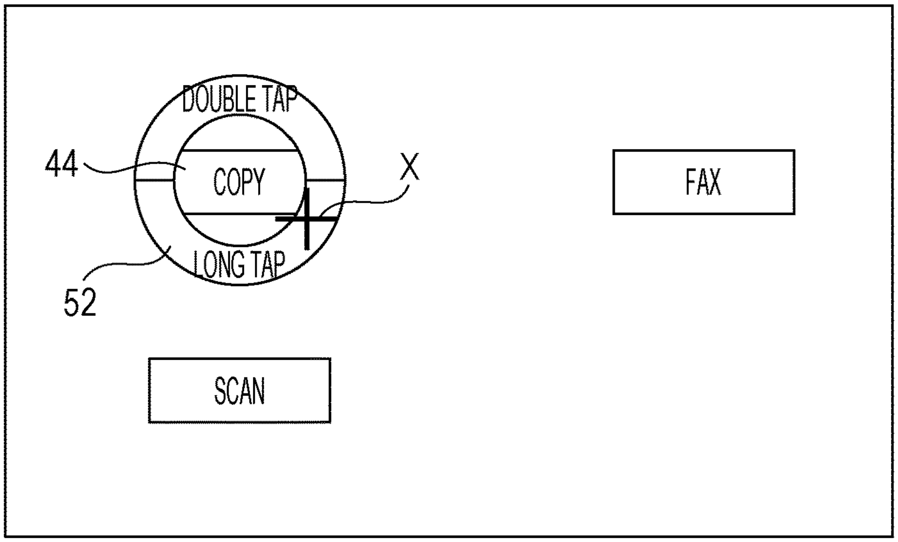
FIGS. 16A to 16F are diagrams illustrating processing at a time when a log tap is performed.
Figure 16B:
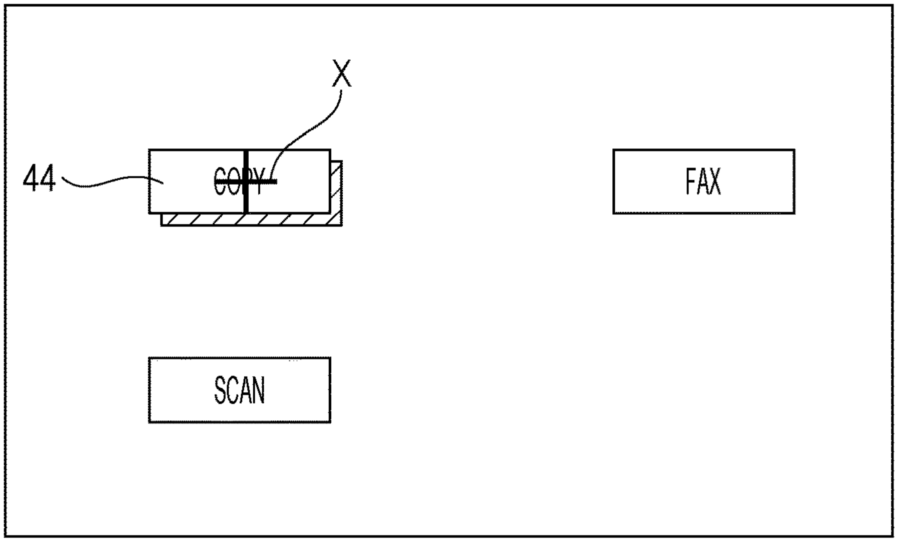
Figure 16C:
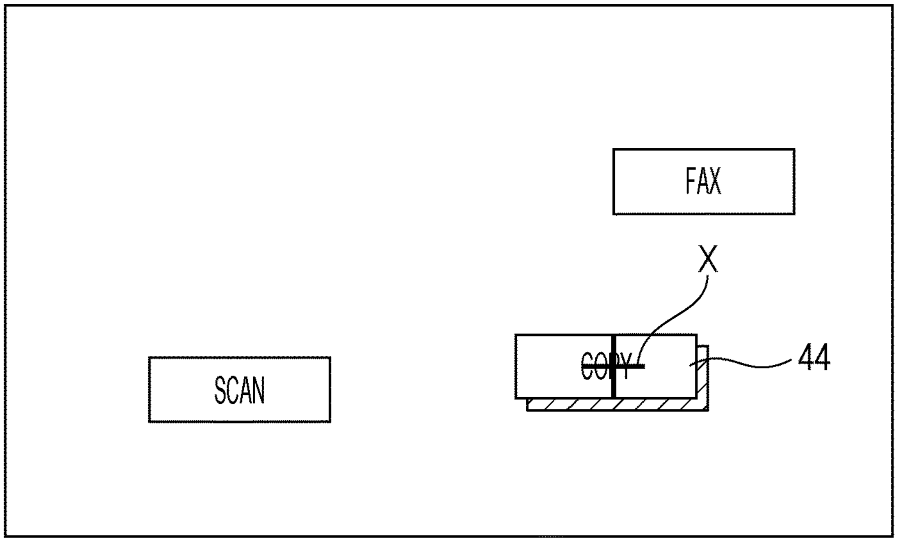
Figure 16D:
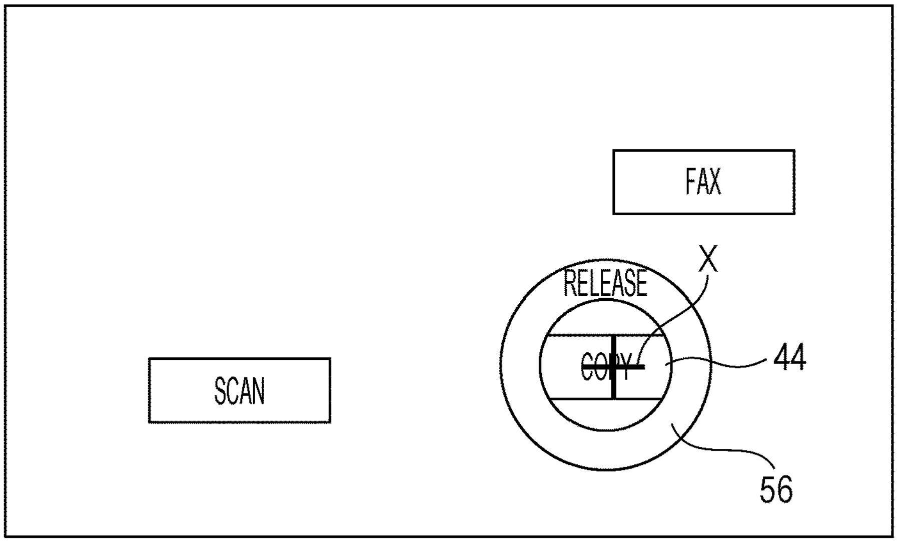
Figure 16E:
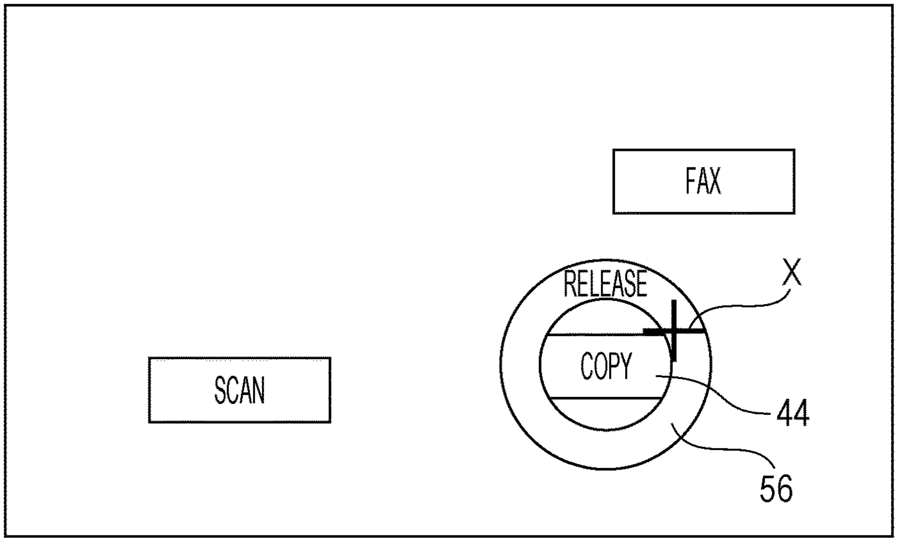
Figure 16F:
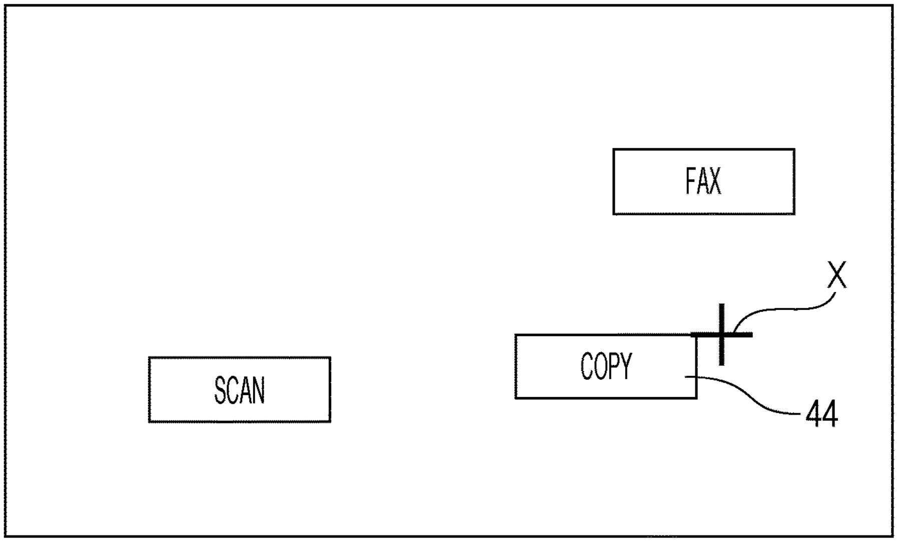

If an operation has been performed on the second operation object 52 for "long tap", for example, processing for changing a display position of the operation icon 44 for "copy", which is the operation target icon, may be performed as illustrated in FIGS. 16A to 16F. That is, when an operation is performed on the second operation object 52 for "long tap" (FIG. 16A), the operation icon 44 for "copy" is selected and the display position thereof on the display screen of the display 12 can be changed (FIGS. 16B and 16C). By moving the operation medium 32 with respect to the operation surface, the user can move the selected operation icon 44 for "copy" in the operation screen to a desired position. If a specific noncontact operation is performed after the operation icon 44 for "copy" is moved to the desired display position, an operation object 56 for "release" is displayed (FIG. 16D). If an operation is then performed on the operation object 56 for "release" (FIG. 16E), the display position of the operation icon 44 for "copy" is fixed (FIG. 16F).

The operation object and the second operation object are not limited to those in the above example, and may be any operation objects for performing operations corresponding to noncontact gesture operations.

Although not illustrated, if an operation is performed on the second operation object for "cancellation", an already displayed second operation object may be removed. Alternatively, when an operation has not been performed on a second operation object for a certain reference period of time after the second operation object was displayed, the second operation object may be removed, and the operation screen 40 before the second operation object was displayed may be restored. If the object sensor 14 no longer detects an object, a second operation object may be removed on an assumption that a noncontact operation performed by the user has ended, and the operation screen 40 before the second operation object was displayed may be restored.

In step S34, whether a specific noncontact operation has been performed. The operation determination unit 24 performs the processing in this step. Whether a period of time for which an operation has not been performed on the operation object in step S30 after the operation object was displayed in step S26 is longer than or equal to a reference period of time is determined. If the period of time for which an operation has not been performed on the operation object is shorter than the reference period of time, the information processing returns to step S28 and is repeated from the detection of an operation performed on the operation object. If the period of time for which an operation has not been performed on the operation object is longer than or equal to the reference period of time, the information processing proceeds to step S36.

If a second operation object need not be displayed, steps S26 to S34 need not be performed. Alternatively, steps S26 to S34 may be repeated as necessary to display a third operation object, a fourth operation object, and so on in addition to the second operation object, and processing for these operation objects may be performed.

In step S36, processing for removing the second operation object is performed. The operation object display processing unit 26 performs the processing in this step. Here, the second operation object is removed, and the operation screen 40 before the second operation object was displayed is restored.

Figure 17A:
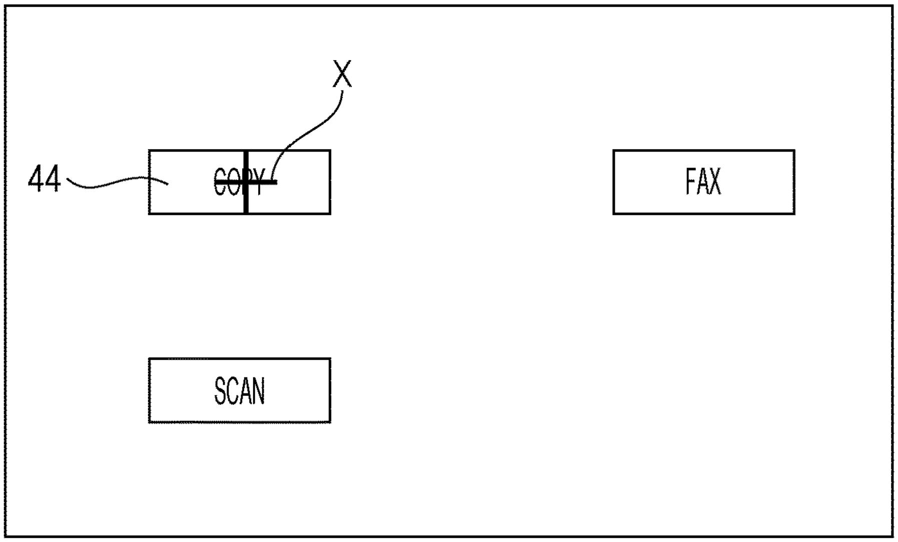
FIGS. 17A to 17E are diagrams illustrating an example where an animation is displayed.
Figure 17B:
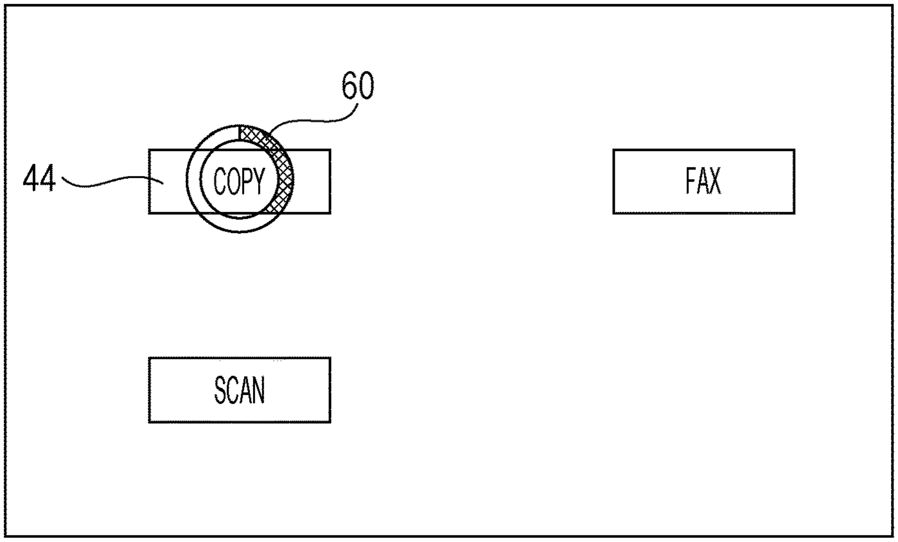
Figure 17C:
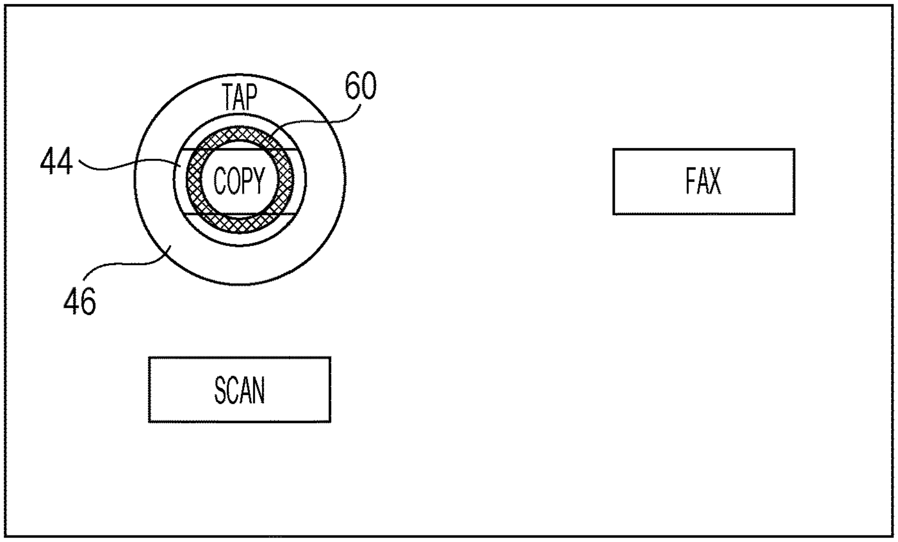
Figure 17D:
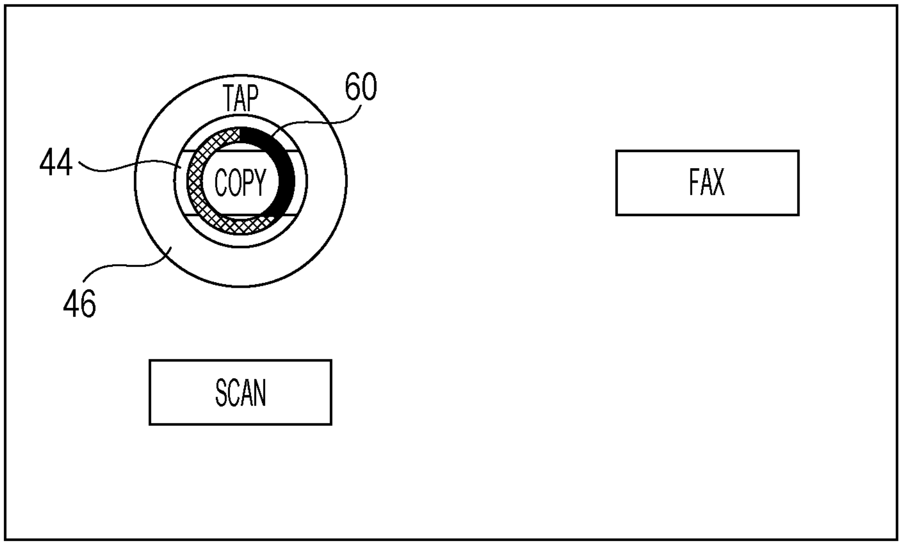
Figure 17E:
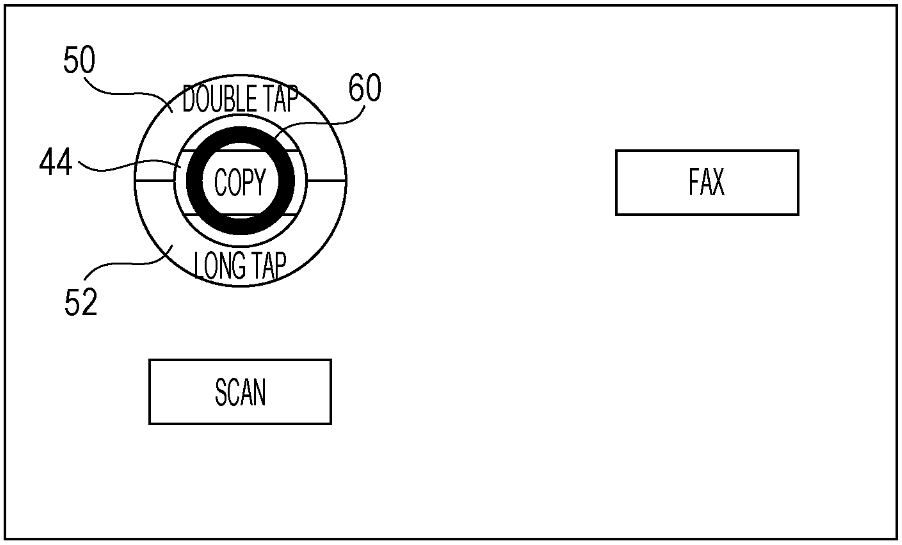

When an operation object is displayed, an animation may be used. As illustrated in FIGS. 17A to 17E, for example, a shape of the cursor X may be changed to display an indicator 60 until the operation object 46 and the second operation object 52 are displayed. The indicator 60 visually indicates elapse of time until the reference period of time in step S12 elapses (FIGS. 17A and 17B). When the reference period of time in step S12 has elapsed, the indicator 60 is filled, and the operation object 46 is displayed in step S16 (FIG. 17C). The indicator 60 then visually indicates elapse of time until the reference period of time in step S24 elapses (FIG. 17D). When the reference period of time in step S24 has elapsed, the indicator 60 is filled, and the second operation objects 50 and 52 are displayed in step S26 (FIG. 17E).

The animation used is not limited to the above example. For example, a certain gesture, such as a gesture of drawing a small circle by moving the cursor X, may be displayed, instead. Alternatively, for example, the shape of the cursor X may be changed to a hand, and the hand may open during an operation.

Figure 18A:
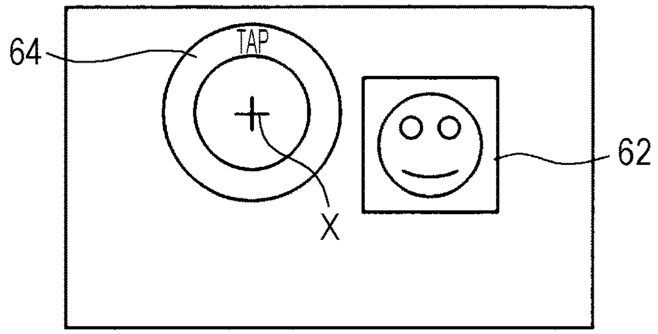
FIGS. 18A to 18E are diagrams illustrating an example where a pinch-out or a pinch-in is performed.
Figure 18B:
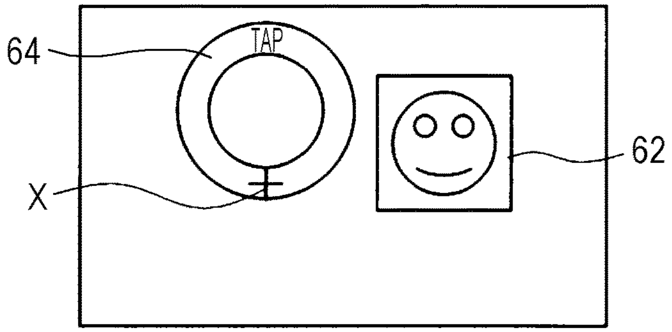
Figure 18C:
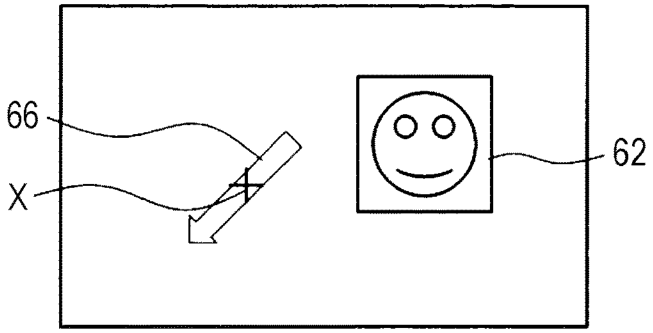
Figure 18D:
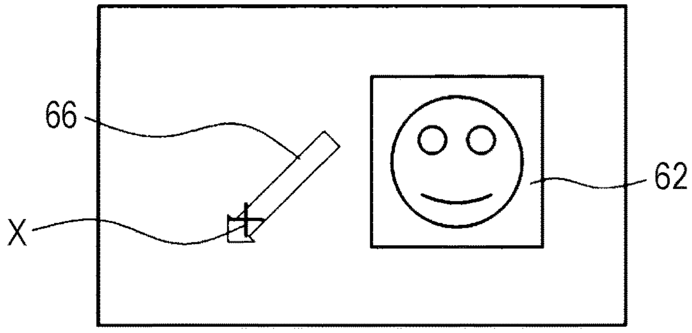
Figure 18E:
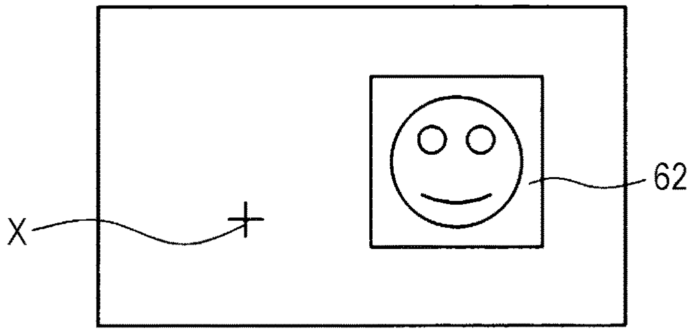

In addition, a gesture operation that requires specification of a position in the operation screen 40, such as a pinch-in or a pinch-out, can be achieved using an operation object. As illustrated in FIGS. 18A to 18E, for example, a pinch-out can be achieved. First, when a specific noncontact operation is performed on the operation screen 40 on which an image 62 to be enlarged is displayed, an operation object 64 for performing a pinch is displayed (FIG. 18A). If an operation is performed on the operation object 64 for performing a pinch (FIG. 18B), an operation object 66 for performing a pinch is displayed (FIG. 18C). The operation object 66 for performing a pinch may be displayed in a mode that shows a method of a pinch. An arrow-shaped operation object 66 indicating a direction in which the operation medium 32 is to be moved from a current position, for example, may be used. When the operation medium 32 is moved in the direction indicated by the operation object 66 from a position of the cursor X at a time when the operation object 64 was displayed (FIG. 18D), the image 62 to be operated is enlarged or reduced in accordance with the movement. If the position of the closest part of the operation medium 32 moves away from the image 62 from the position of the cursor X at a time when the operation object 64 was displayed, for example, the image 62 to be operated is enlarged. If the position of the closest part of the operation medium 32 moves closer to the image 62 from the position of the cursor X at a time when the operation object 64 was displayed, for example, the image 62 to be operated is reduced. When the image 62 to be operated achieves a desired size, the position of the operation medium 32 is fixed, and a specific noncontact operation is performed to complete the pinch-out (FIG. 18E). If the operation medium 32 remains unmoved until a certain reference period of time elapses, for example, the pinch-out is completed.

The same processing may be performed for a pinch-in. For example, the image 62 may be reduced through a pinch-in by moving the operation medium 32 in a direction opposite the direction of the arrow of the operation object 66 for performing a pinch.

Directions of a pinch-out and a pinch-in are not particularly limited, and may be directions parallel or perpendicular to a direction of a previous operation performed on the operation object 64 for performing a pinch. For a pinch-out and a pinch-in, the operation medium 32 need not be linearly moved along the operation object 66 for performing a pinch, and may draw a circle or the like from a position at which the operation object 64 for performing a pinch was used. For example, a pinch-out may be performed by drawing a clockwise circle with the operation medium 32 over the operation screen 40, and a pinch-in may be performed by drawing a counterclockwise circle with the operation medium 32 over the operation screen 40.

The operation object 66 for performing a pinch need not be displayed. For example, a state where a pinch-out or a pinch-in is being performed may be presented to the user using any method, and a pinch-out or a pinch-in may be performed by performing an operation in this state.

Methods and display modes of a pinch-out and a pinch-in may be changed as necessary. For example, an arrow-shaped operation object 66 for performing a pinch may be displayed for a pinch-out or a pinch-in near the center of the operation screen 40, and a pinch-out and a pinch-in may be performed by drawing a circle with the operation medium 32 near an edge of the operation screen 40.

Although an exemplary embodiment of the present disclosure has been described, the present disclosure is not limited to the above exemplary embodiment and may be modified in various ways without deviating from the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

detect a specific noncontact operation performed by a user on an operation surface; and display, if the specific noncontact operation is detected, an operation object for achieving a gesture operation based on movement of the user with respect to the operation surface.

(((2)))

The information processing apparatus according to (((1))), wherein the gesture operation is an operation performed on a basis of the movement of the user with the user in contact or noncontact with the operation surface.

(((3)))

The information processing apparatus according to (((1))) or (((2))), wherein the processor is configured to display at least one operation object as a first operation object and then detect a specific noncontact operation performed by the user on the operation surface, and wherein the processor is configured to display, if the specific noncontact operation is detected, at least one another operation object different from the first operation object as a second operation object.

(((4)))

The information processing apparatus according to (((3))), wherein the first operation object is used to achieve a gesture operation whose use frequency is higher than a use frequency of a gesture operation achieved by the second operation object.

(((5)))

The information processing apparatus according to any one of (((1))) to (((4))), wherein the processor is configured to change area of a display area of the operation object in accordance with a use frequency of the gesture operation indicated by the operation object.

(((6)))

The information processing apparatus according to any one of (((1))) to (((5))), wherein the processor is configured to achieve the gesture operation indicated by the operation object using, as a reference, a position of a cursor on the operation surface at a time when the operation object was displayed.

(((7)))

The information processing apparatus according to any one of (((1))) to (((6))), wherein the processor is configured to change a display mode of the operation object in accordance with a display position of the operation object on the operation surface.

(((8)))

The information processing apparatus according to any one of (((1))) to (((7))), wherein the processor is configured to remove the displayed operation object if a certain condition is satisfied.

(((9)))

A program causing a computer to execute a process for processing information, the process comprising:

detecting a specific noncontact operation performed by a user on an operation surface; and displaying, if the specific noncontact operation is detected, an operation object for achieving a gesture operation based on movement of the user with respect to the operation surface.

What is claimed is:

1. An information processing apparatus comprising:

a processor configured to:

detect a specific noncontact operation performed by a user on an operation surface of a display; and when the specific noncontact operation is detected, display an operation object for achieving a gesture operation based on movement of the user with respect to the operation surface, the operation object indicating a first type of the gesture operation to be performed, and the operation object including a first operation object;

after a predetermined time elapses without an operation being performed on the first operation object, detect another specific noncontact operation performed by the user on the operation surface, and display, in response to detecting the another specific noncontact operation, a second operation object different from the first operation object in the operation object the second operation object indicating a second type of the gesture operation to be performed.

2. The information processing apparatus according to claim 1, wherein the gesture operation is an operation performed on a basis of the movement of the user with the user in contact or noncontact with the operation surface.

3. The information processing apparatus according to claim 1, wherein the first operation object is used to achieve a gesture operation having a use frequency higher than a use frequency of a gesture operation achieved by the second operation object.

4. The information processing apparatus according to claim 1, wherein the processor is configured to change an area of a display area of the operation object in accordance with a use frequency of the gesture operation indicated by the operation object.

5. The information processing apparatus according to claim 1, wherein the processor is configured to achieve the gesture operation indicated by the operation object using, as a reference, a position of a cursor on the operation surface at a time when the operation object was displayed.

6. The information processing apparatus according to claim 1, wherein the processor is configured to change a display mode of the operation object in accordance with a display position of the operation object on the operation surface.

7. The information processing apparatus according to claim 1, wherein the processor is configured to remove the displayed operation object when a certain condition is satisfied.

8. The information processing apparatus according to claim 1, wherein the processor is further configured to:

execute the gesture operation indicated by the operation object based on movement of the user from a position of a cursor on the operation surface at a time when the operation object was displayed.

9. The information processing apparatus according to claim 1, wherein the first operation object comprises a plurality of operation objects displayed simultaneously, the plurality of operation objects including a third operation object indicating a third type of gesture operation and a fourth operation object indicating a fourth type of gesture operation different from the first type of gesture operation.

10. A non-transitory computer readable medium storing a program causing a computer to execute a process for processing information, the process comprising:

detecting a specific noncontact operation performed by a user on an operation surface of a display; and when the specific noncontact operation is detected, displaying an operation object for achieving a gesture operation based on movement of the user with respect to the operation surface, the operation object indicating a type of the gesture operation to be performed, and the operation object including a first operation object, after a predetermined time elapses without an operation being performed on the first operation object, detecting another specific noncontact operation performed by the user on the operation surface, and displaying, in response to detecting the another specific noncontact operation, a second operation object different from the first operation object in the operation object, and the second operation object indicates a second type of the gesture operation to be performed.

11. A method for processing information, the method comprising:

detecting a specific noncontact operation performed by a user on an operation surface of a display; and when the specific noncontact operation is detected, displaying an operation object for achieving a gesture operation based on movement of the user with respect to the operation surface, the operation object indicating a type of the gesture operation to be performed, and the operation object including a first operation object, after a predetermined time elapses without an operation being performed on the first operation object, detecting another specific noncontact operation performed by the user on the operation surface, and displaying, in response to detecting the another specific noncontact operation, a second operation object different from the first operation object in the operation object, and the second operation object indicates a second type of the gesture operation to be performed.

* * * * *